US009718009B2

(12) United States Patent
Boston

(10) Patent No.: US 9,718,009 B2
(45) Date of Patent: Aug. 1, 2017

(54) PRESSURE SENSITIVE VALVE ASSEMBLY INCORPORATING ENHANCED RETENTION LEGS AND FLUID FILTER INCLUDING THE SAME

(71) Applicant: West Troy, LLC, Troy, OH (US)

(72) Inventor: Sean Boston, Troy, OH (US)

(73) Assignee: West Troy, LLC, Troy, OH (US)

( * ) Notice: Subject to any disclaimer, the term of this patent is extended or adjusted under 35 U.S.C. 154(b) by 81 days.

(21) Appl. No.: 14/947,756

(22) Filed: Nov. 20, 2015

(65) Prior Publication Data

US 2016/0146360 A1 May 26, 2016

Related U.S. Application Data

(60) Provisional application No. 62/082,731, filed on Nov. 21, 2014, provisional application No. 62/083,752, filed on Nov. 24, 2014.

(51) Int. Cl.
| | | |
|---|---|---|
| *B01D 35/147* | (2006.01) | |
| *B01D 35/30* | (2006.01) | |
| *F16K 15/02* | (2006.01) | |
| *F16K 17/04* | (2006.01) | |
| *B01D 27/10* | (2006.01) | |

(52) U.S. Cl.
CPC ....... *B01D 35/1475* (2013.01); *B01D 27/103* (2013.01); *B01D 27/106* (2013.01); *F16K 15/028* (2013.01); *F16K 17/0413* (2013.01)

(58) Field of Classification Search
None
See application file for complete search history.

(56) References Cited

U.S. PATENT DOCUMENTS

| 758,377 A | 4/1904 | Miller |
|---|---|---|
| 2,564,023 A | 8/1951 | Miller |
| (Continued) | | |

FOREIGN PATENT DOCUMENTS

| GB | 2010140 A | 12/1982 |
|---|---|---|
| JP | 09133233 A | 5/1997 |
| (Continued) | | |

OTHER PUBLICATIONS

Search Report for International Application No. PCT/US2011/048363 dated Mar. 21, 2012.

*Primary Examiner* — Terry Cecil
(74) *Attorney, Agent, or Firm* — Dinsmore & Shohl LLP

(57) ABSTRACT

A fluid filter having a filter canister, a fluid inlet, a fluid outlet, filter media, and a pressure sensitive valve assembly is described. The pressure sensitive valve assembly comprises an orifice surround, a pressure relief spring, and a valve plug comprising a valve head and first and second retention legs. The first and second retention legs of the valve plug are spaced apart from one another, extend from a leg base positioned at the sealing side of the valve head to a distal end of the retention leg, and comprise respective seating regions, tapered transition regions, and clearance regions. Each of the respective seating regions comprises a spring engaging hook structurally configured to receive a seating portion of the pressure relief spring. The pressure relief spring is compressed between the orifice surround and the spring engaging hooks to bias the pressure sensitive valve assembly towards the closed state.

19 Claims, 11 Drawing Sheets

(56) References Cited

U.S. PATENT DOCUMENTS

| | | | |
|---|---|---|---|
| 2,870,576 A | 1/1959 | Parker | |
| 3,001,546 A * | 9/1961 | Salisbury | F16K 15/026 137/541 |
| 3,132,097 A | 5/1964 | Tietz | |
| 3,224,591 A | 12/1965 | Sawyer | |
| 3,263,701 A | 8/1966 | Johnson | |
| 3,335,751 A | 8/1967 | Davis, Jr. | |
| 3,411,632 A | 11/1968 | Offer et al. | |
| 3,616,933 A | 11/1971 | Baldwin | |
| 3,794,170 A | 2/1974 | Yamaguchi | |
| 3,807,561 A | 4/1974 | Cullis | |
| 4,045,349 A | 8/1977 | Humbert, Jr. | |
| 4,075,097 A | 2/1978 | Paul | |
| 4,129,144 A | 12/1978 | Andersson et al. | |
| 4,168,237 A | 9/1979 | Pickett et al. | |
| 4,314,903 A | 2/1982 | Hanley | |
| 4,400,864 A | 8/1983 | Peyton et al. | |
| 4,421,444 A | 12/1983 | Hanley et al. | |
| 4,473,471 A | 9/1984 | Robichaud et al. | |
| 4,935,127 A | 6/1990 | Lowsky et al. | |
| 4,990,247 A | 2/1991 | Vandenberk | |
| 5,250,176 A | 10/1993 | Daniel et al. | |
| 5,362,390 A | 11/1994 | Widenhoefer et al. | |
| 5,374,355 A | 12/1994 | Habiger et al. | |
| 5,490,930 A | 2/1996 | Krull | |
| 6,202,859 B1 | 3/2001 | Langsdorf et al. | |
| 6,284,130 B1 | 9/2001 | Daniel | |
| 6,345,721 B1 | 2/2002 | Durre et al. | |
| 6,349,836 B1 | 2/2002 | Langsdorf et al. | |
| 6,468,425 B2 | 10/2002 | Reinhart | |
| 6,595,372 B1 | 7/2003 | Minowa et al. | |
| 6,610,203 B1 | 8/2003 | Jainek | |
| 6,615,989 B2 | 9/2003 | Brown et al. | |
| 7,934,617 B2 | 5/2011 | Minowa et al. | |
| 8,685,243 B2 | 4/2014 | Bilski et al. | |
| 8,757,200 B2 | 6/2014 | Davidson et al. | |
| 2002/0030007 A1 | 3/2002 | Koh | |
| 2003/0015240 A1 | 1/2003 | Nelson et al. | |
| 2005/0103386 A1 | 5/2005 | Magda | |
| 2006/0137316 A1 | 6/2006 | Krull et al. | |
| 2006/0201556 A1 | 9/2006 | Hamza | |
| 2008/0087590 A1 | 4/2008 | Jergens | |
| 2010/0108589 A1 | 5/2010 | Frye et al. | |
| 2012/0042969 A1 | 2/2012 | Davidson | |
| 2014/0251465 A1 | 9/2014 | Davidson et al. | |
| 2014/0299205 A1 | 10/2014 | Boston | |
| 2015/0251115 A1 | 9/2015 | Boston | |

FOREIGN PATENT DOCUMENTS

| | | |
|---|---|---|
| WO | 9511072 A | 12/1982 |
| WO | 2010062666 A2 | 6/2010 |

\* cited by examiner

PRESSURE SENSITIVE VALVE ASSEMBLY INCORPORATING ENHANCED RETENTION LEGS AND FLUID FILTER INCLUDING THE SAME

CROSS REFERENCE TO RELATED APPLICATIONS

This application claims the benefit of U.S. Provisional Application Ser. No. 62/082,731, filed Nov. 21, 2014, and entitled "NEXT GEN TIP-RESISTANT VALVE PLUGS," and U.S. Provisional Application Ser. No. 62/083,752, filed Nov. 24, 2014, and entitled "NEXT GEN VALVE PLUGS."

BACKGROUND

The present invention relates to fluid filter assemblies and, more particularly, to relief valves used therein.

BRIEF SUMMARY

According to the subject matter of the present disclosure, a fluid filter and pressure sensitive relief valve assembly are provided to address particular challenges associated with the incorporation of pressure sensitive relief valve assemblies in fluid filters. Specifically, the present inventors have recognized a continuing drive in the industry to improve relief valve design and performance. The subject matter of the present disclosure addresses challenges associated with this effort by providing a relief valve with enhanced spring engaging retention legs.

In accordance with one embodiment of the present disclosure, a pressure sensitive valve assembly comprises an orifice surround, a pressure relief spring, and a valve plug comprising a valve head and first and second retention legs. The first and second retention legs of the valve plug are spaced apart from one another, extend from a leg base positioned at the sealing side of the valve head to a distal end of the retention leg, and comprise respective seating regions, tapered transition regions, and clearance regions. The respective clearance regions of the first and second retention legs extend from the valve head to the tapered transition regions of the first and second retention legs. The tapered transition regions of the first and second retention legs extend outwardly from the clearance regions to the seating regions of the first and second retention legs such that the first and second retention legs collectively define a seating region diameter that is greater than a clearance region diameter of the valve plug. Each of the respective seating regions comprises a spring engaging hook structurally configured to receive a seating portion of the pressure relief spring. Each spring engaging hook comprises an inner guiding face, an outer containing face substantially parallel to the inner guiding face, and a bridging face extending from the inner guiding face to the outer containing face. The inner guiding face and the outer containing face of each spring engaging hook are oriented substantially parallel to a direction of compression of the pressure relief spring and are spaced apart from one another by a hook width that is at least as large as a radial thickness dimension of the seating portion of the pressure relief spring. The pressure relief spring is compressed between the orifice surround and the spring engaging hooks to bias the pressure sensitive valve assembly towards a closed state. The inner guiding face of each spring engaging hook extends from the bridging face of the spring engaging hook to the tapered transition region of the retention leg. The outer containing face of each retention leg extends from the bridging face of the spring engaging hook of the retention leg to a hook terminus that is displaced from the bridging face by a containment length that is at least as great as one-half of the hook width.

In accordance with another embodiment of the present disclosure, a fluid filter comprises a filter canister, a fluid inlet, a fluid outlet, filter media, a non-filtering zone, a pressure relief flow path, and a pressure sensitive valve assembly disposed within the pressure relief flow path Although the concepts of the present disclosure are described herein with primary reference to can-type oil filters, it is contemplated that the concepts will enjoy applicability to a variety of fluid filters where a relief valve is incorporated in the filter design. Contemplated filter types include, but are not limited to, oil, gas, alcohol, and water filters, multi-phase fluid filters, and/or the like.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
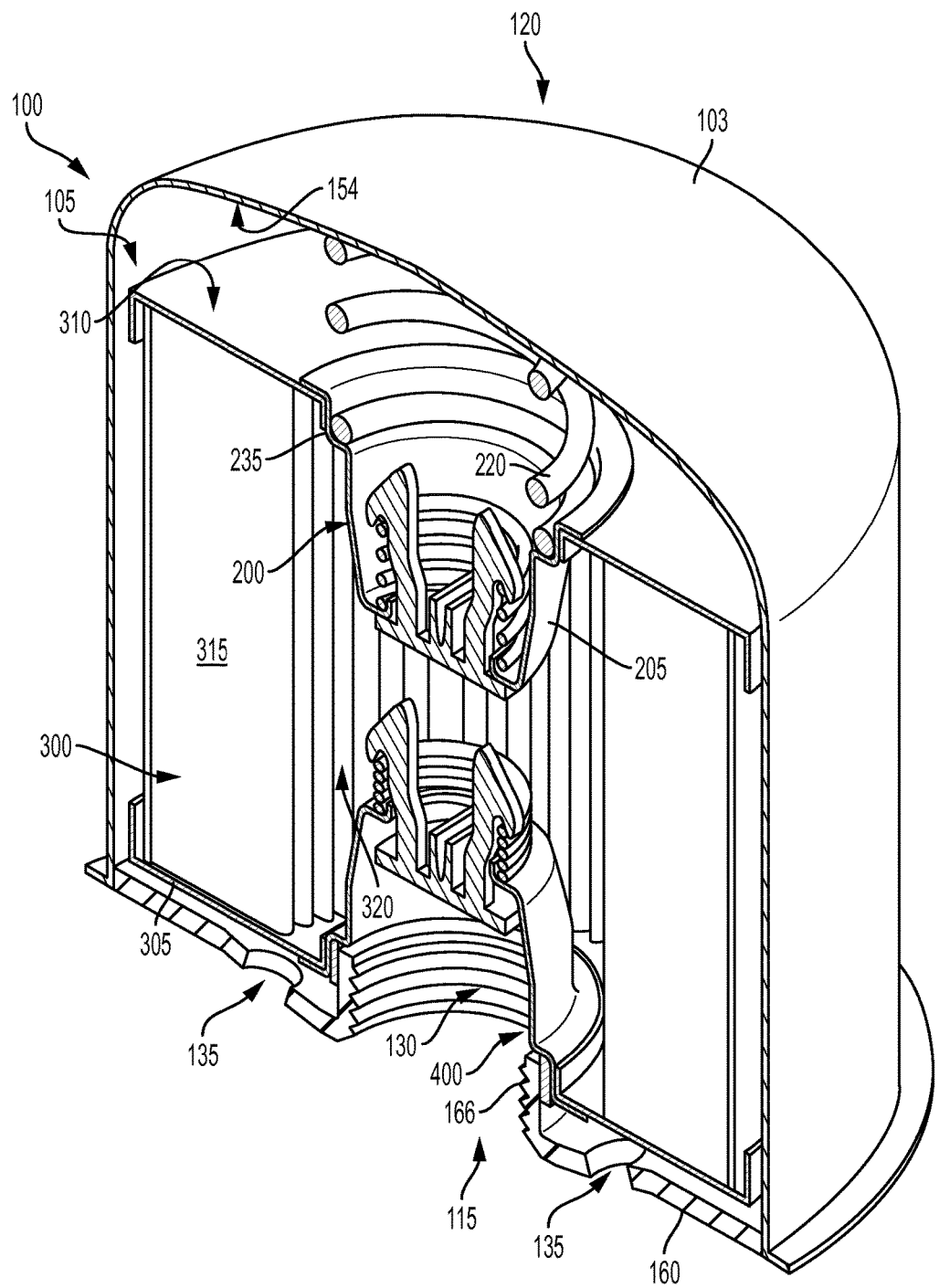
FIG. 1 depicts a sectional isometric view of an illustrative fluid filter according to one or more embodiments shown and described herein.
Figure 1:
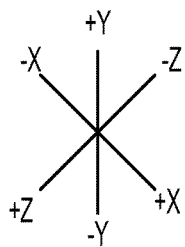

FIG. 1 depicts a sectional isometric view of a fluid filter, generally designated 100, according to one embodiment of the present disclosure. In the illustrated embodiment, the fluid filter 100 is configured as an oil filter but it is contemplated that fluid filters according to the present disclosure may be configured as any type of single or multi-phase fluid filter, e.g., a gasoline filter, a water filter, an alcohol filter, etc. The fluid filter 100 includes a filter canister 103, fluid inlets 135, a fluid outlet 130, filter media 300, and a relief valve assembly 200. In various embodiments, the relief valve assembly 200 and the filter media 300 are arranged in the filter canister 103 to form the fluid filter 100.

In various embodiments, the filter canister 103 is generally an outer portion of the fluid filter 100 and contains the other components of the fluid filter 100 therein. In some embodiments, the filter canister 103 is defined at least by a bypass end 120 and an outlet end 115. The bypass end 120 is located distally (i.e., towards the +y direction) of the filter canister 103. In contrast, the outlet end 115 is located proximally (i.e., towards the -y direction) of the filter canister 103.

The outlet end 115 of the filter canister 103 may include a mounting plate 160. The mounting plate 160 may be arranged such that the fluid filter 100 can be mounted or otherwise affixed to various apparatuses (not shown), such as, for example, one or more motor vehicle components, as described in greater detail herein. The particular configuration of the mounting plate 160 is beyond the scope of the present disclosure and may be gleaned from a variety of teachings in the art, such as, for example, U.S. Pat. Nos. 3,807,561, 6,893,560, and 8,187,458.

In some embodiments, the mounting plate 160 may contain a plurality of orifices therein, which may define the fluid inlet 135 and the fluid outlet 130. The fluid inlet 135 and the fluid outlet 130, respectively, are arranged such that fluid can flow therethrough. For example, fluid may flow into the fluid filter 100, particularly into the filter canister 103 via the fluid inlet 135. In some embodiments, the fluid inlet 135 is fluidly coupled to one or more portions of the fluid filter 100 such that fluid can flow into the one or more portions from the fluid inlet 135. Illustrative portions that are coupled to the fluid inlet 135 include, but are not limited to, a filtered fluid zone, an unfiltered fluid zone, one or more portions of the relief valve assembly 200, and one or more portions of the filter media 300, as described in greater detail herein. The fluid outlet 130 is generally aligned with an inner fluid passage 320 of the filter media 300, as described in greater detail herein. Thus, the fluid outlet 130 is fluidly coupled with the inner fluid passage 320 such that fluid flowing through the inner fluid passage 320 flows out of the fluid outlet 130.

In some embodiments, the fluid outlet 130 may include a centrally located threaded mounting orifice 166. In some embodiments, the threaded mounting orifice 166 may be centrally located with respect to the filter canister 103. That is, the threaded mounting orifice 166 may be located in a center portion of the mounting plate 160 of the filter canister 103. In some embodiments, the fluid inlet 135 may include a plurality of inlet orifices distributed peripherally about the threaded mounting orifice 166. The threaded mounting orifice 166 may include a threaded surface on an internal wall within the fluid outlet 130, which is threaded such that the fluid filter 100 can be attached to an apparatus, such as one or more portions of a motor vehicle, by screwing the fluid filter 100 onto the apparatus. Thus, the threaded mounting orifice 166 may correspond in shape, size, and configuration to a threaded surface of the one or more portions of the motor vehicle.

The filter canister 103 may further be any size or shape, particularly sizes and/or shapes suitable to contain the various other components of the fluid filter 100 therein. While the filter canister 103 is depicted as being generally cylindrical in shape, the filter canister 103 may include other shapes, such as rounded edges or irregular shapes and/or designs. In some embodiments, the filter canister 103 may be a substantially cylindrical filter canister 103 that is closed at one end by the bypass end 120 and at another end (e.g., the opposite end) by the mounting plate 160.

Figure 2:
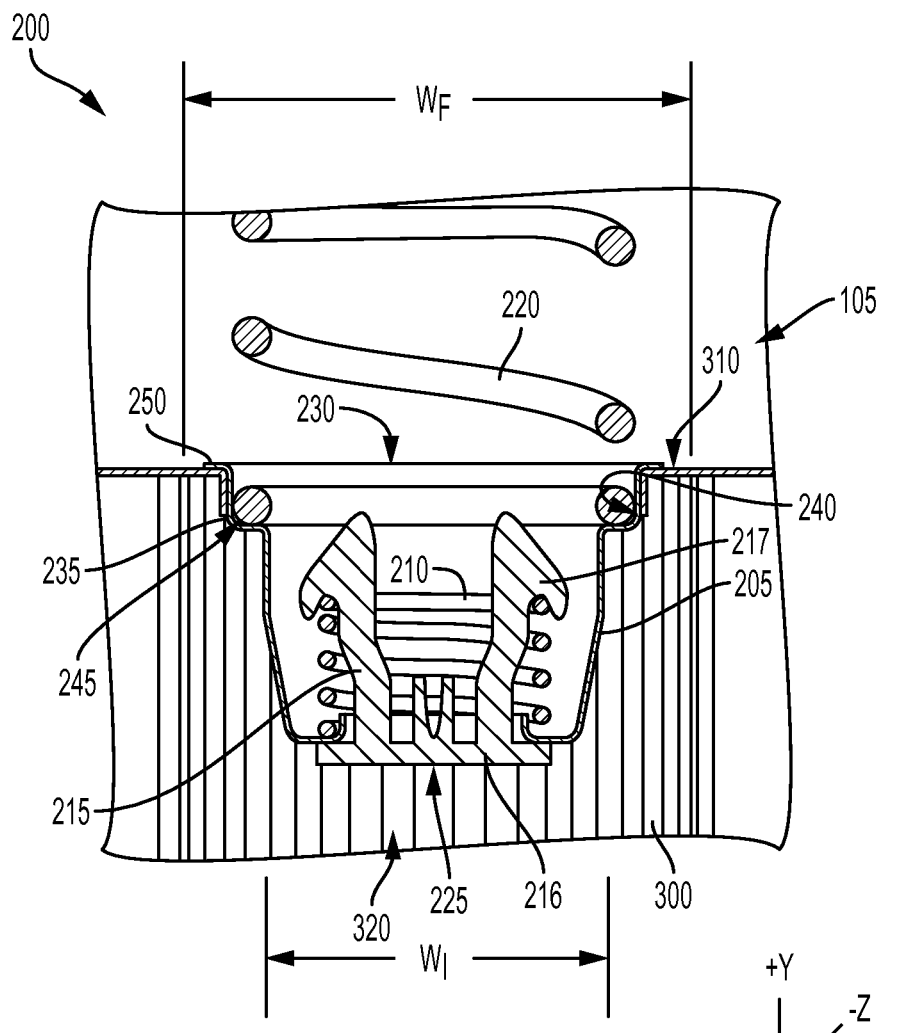
FIG. 2 depicts a sectional side view of an illustrative relief valve assembly according to one or more embodiments shown and described herein.

Referring to FIG. 2, the relief valve assembly 200 includes a bypass housing 205, a bypass spring 210, a valve plug 215, and a locator spring 220. The bypass housing 205 includes a leading portion 225 and a trailing portion 230. The leading portion 225 of the bypass housing 205 is proximally located (i.e., towards the -y direction). In addition, the trailing portion 230 of the bypass housing 205 is distally located (i.e., towards the +y direction). Thus, when the relief valve assembly 200 is arranged in the fluid filter 100 (FIG. 1), the leading portion 225 of the bypass housing 205 extends into the inner fluid passage 320 of the filter media 300 from a bypass end 310 of the filter media 300, as described in greater detail herein.

Figure 3:
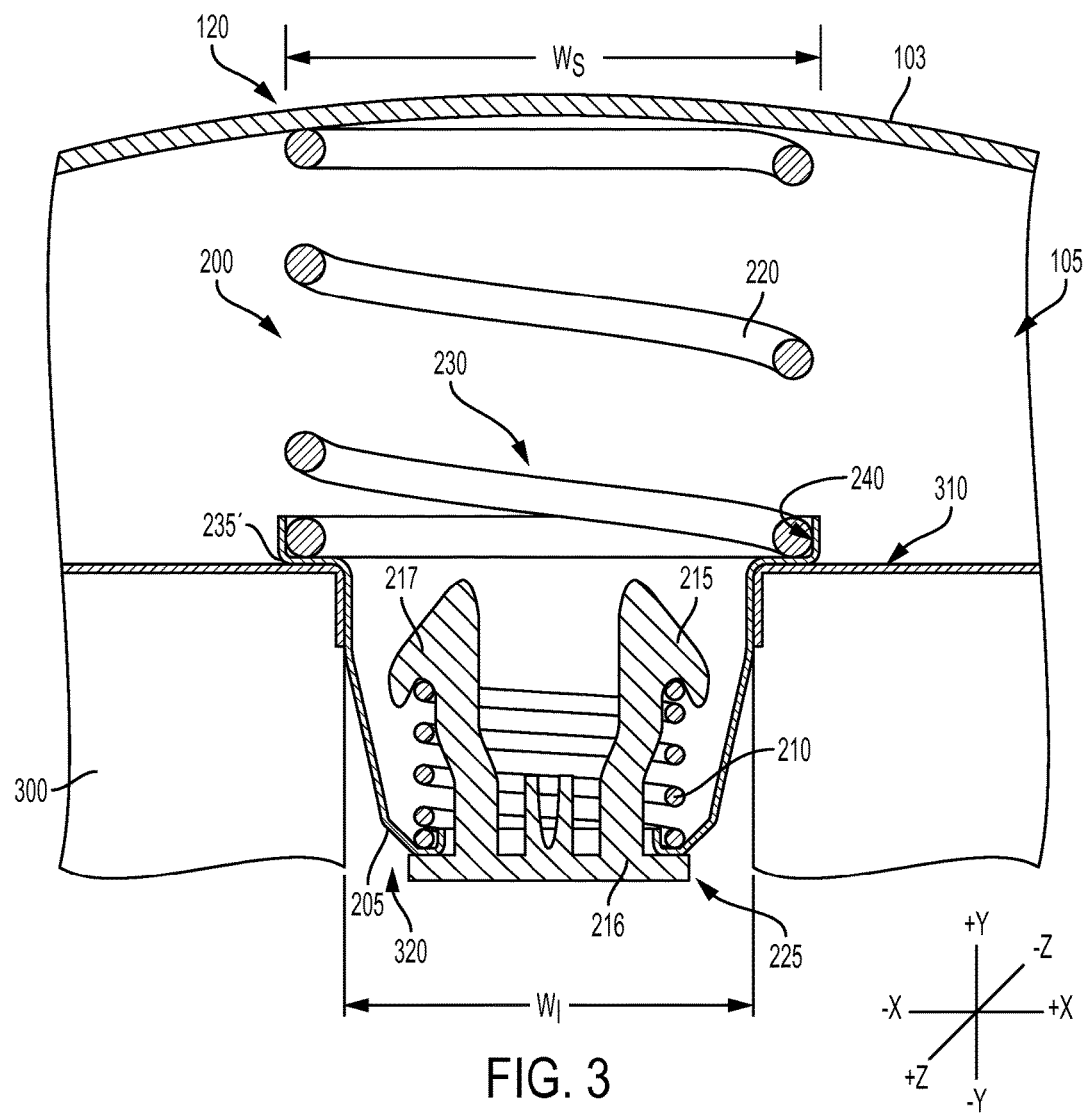
FIG. 3 depicts a sectional side view of an illustrative relief valve assembly in a closed position according to another embodiment shown and described herein.
Figure 4:
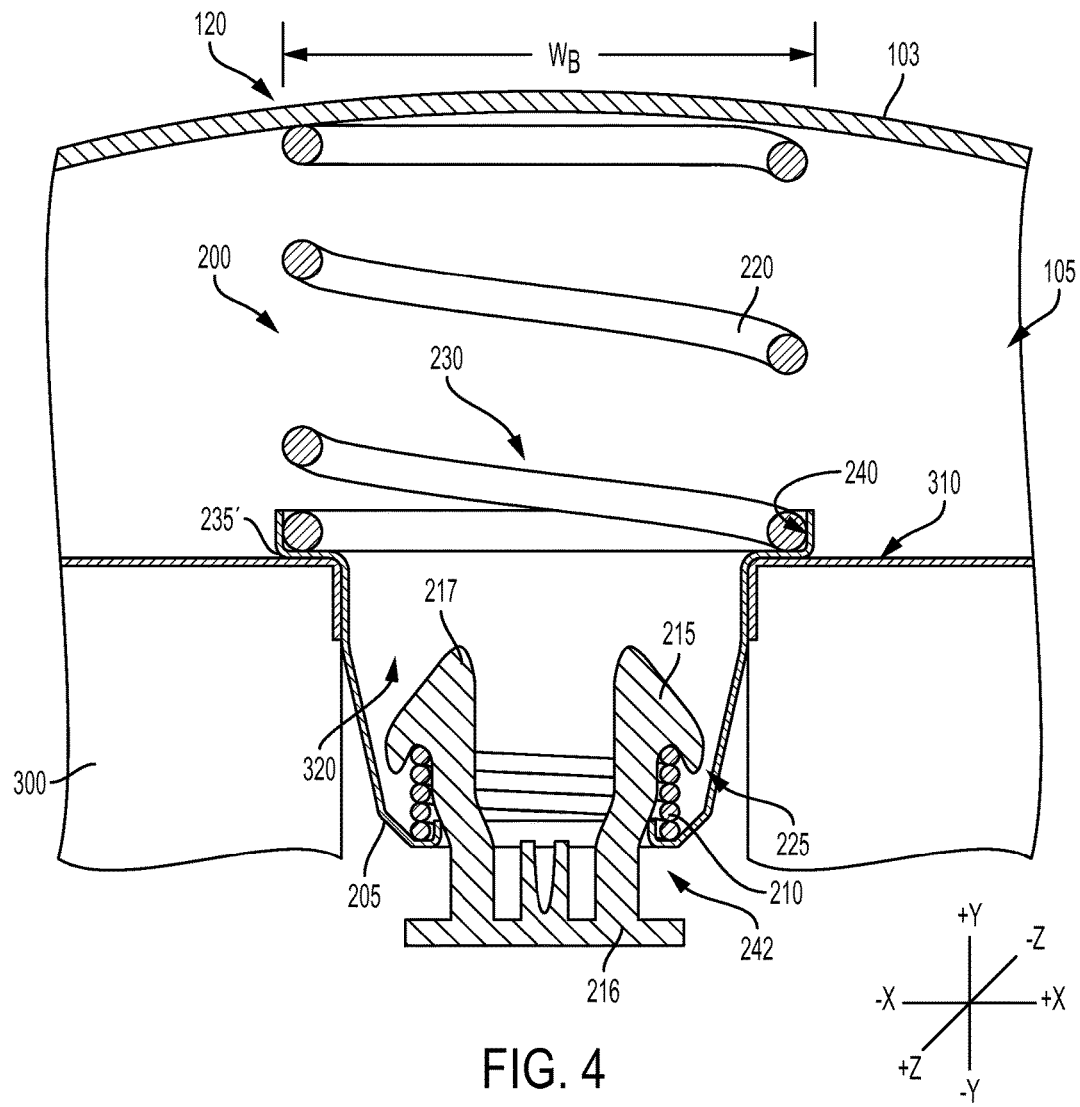
FIG. 4 depicts a sectional side view of the illustrative relief valve assembly of FIG. 3 in an open position according to one or more embodiments shown and described herein.

In various embodiments, the trailing portion 230 of the bypass housing 205 is oversized relative to a cross sectional profile of the inner fluid passage 320 of the filter media 300 such that the trailing portion 230 does not extend into the inner fluid passage 320 of the filter media 300. In some embodiments, as shown in FIGS. 1 and 2, the trailing portion 230 of the bypass housing 205 may include a flange 250 positioned at a bypass end 310 of the filter media 300. The flange 250 may generally be oversized relative to the cross sectional profile of the inner fluid passage 320 of the filter media 300. That is, the flange 250 may have a width $W_F$ that is generally larger than a width $W_I$ of the cross sectional profile of the inner fluid passage 320 of the filter media 300. The trailing portion 230 of the bypass housing 205 may further include a circumferential shoulder 235. The circumferential shoulder 235 may extend laterally (e.g., in the +x/-x direction and/or in the +z/-z direction) from the flange 250 towards the inner fluid passage 320 of the filter media 300. In other embodiments, as shown in FIGS. 3 and 4, an alternative circumferential shoulder 235' may be positioned at the bypass end 310 of the filter media 300. The alternative circumferential shoulder 235' may be oversized relative to the cross sectional profile of the inner fluid passage 320 of the filter media 300 such that the alternative circumferential shoulder 235' does not extend towards the inner fluid passage 320. That is, the alternative circumferential shoulder 235' may have a width $W_S$ that is generally larger than a width $W_I$ of the cross sectional profile of the inner fluid passage 320 of the filter media 300. Such a sizing of the trailing portion 230 ensures that the bypass housing 205 does not fully enter into the inner fluid passage 320 when the fluid filter 100 is arranged. In addition, such a sizing of the trailing portion 230 may ensure a proper attachment with the locator spring 220, as described in greater detail herein. Such a sizing of the trailing portion 230 and the leading portion 225 of the bypass housing 205 may also result in the bypass housing 205 being a frustum shaped bypass housing 205 having a frustum-like shape.

Referring again to FIG. 2, in various embodiments, the trailing portion 230 of the bypass housing 205 may include a circumferential sealing portion 245 that, when the relief valve assembly 200 is arranged in the fluid filter 100 (FIG. 1), engages the bypass end 310 of the filter media 300. Accordingly, the circumferential sealing portion 245 may form a seal between the bypass housing 205 and the filter media 300.

Referring to FIG. 4, the leading portion 225 of the bypass housing 205 comprises a proximal opening 242. Such a proximal opening 242 provides a space for fluid to flow through when the valve plug 215 is in an open position, as described in greater detail herein. The proximal opening 242 may generally be any shape and/or size, particularly shapes and/or sizes suitable for receiving the valve plug 215.

Referring to FIGS. 2-4, the bypass spring 210 and/or the valve plug 215 are mechanically coupled to the bypass housing 205. Thus, the bypass spring 210 is mounted within the bypass housing 205. In some embodiments, the valve plug 215 may be mechanically coupled to the bypass housing 205 via the bypass spring 210. For example, the valve plug 215 may be partially located within the bypass spring 210 such that the bypass spring 210 surrounds at least a portion of the valve plug 215. In such an example, the valve plug 215 may include a head portion 216 coupled to a tail portion 217. The head portion 216 of the valve plug 215 may be located externally to the bypass spring 210 such that the head portion 216 abuts the bypass spring 210. The tail portion 217 of the valve plug 215 may extend through a center of the bypass spring 210. In addition, the head portion 216 of the valve plug 215 may extend through the proximal opening 242 in the bypass housing 205. Thus, compression and decompression of the bypass spring 210 causes movement of the valve plug 215 in the +y/−y direction to cover and uncover the proximal opening 242 in the bypass housing 205. Particularly, as shown in FIG. 3, when the bypass spring 210 is decompressed, it biases the valve plug 215 in a closed position (i.e., towards the +y direction) such that the head portion 216 of the valve plug 215 presses against the bypass housing 205, thereby sealing the proximal opening 242 in the leading portion 225 of the bypass housing 205. The valve plug 215 may generally be biased in the closed position by the bypass spring 210 when a bypass fluid pressure on the valve plug 215 is less than or equal to a bypass threshold of the bypass spring 210. As shown in FIG. 4, the valve plug 215 moves into an open position (i.e., towards the −y direction) such that the head portion 216 of the valve plug 215 separates from the bypass housing 205, thereby providing a space for fluid to flow through the proximal opening 242 in the leading portion 225 of the bypass housing 205. The valve plug 215 generally moves into the open position by a force that causes the bypass spring 210 to compress. For example, in some embodiments, the valve plug 215 may move into the open position when the bypass fluid pressure in the bypass housing 205 exceeds the bypass threshold of the bypass spring 210. As such, the bypass fluid pressure may cause the bypass spring 210 to compress. The bypass threshold of the bypass spring 210 is not limited by this disclosure, and may generally be any suitable threshold for initiating bypass flow. In some embodiments, the bypass threshold may correspond to a maximum pressure for inside the fluid filter 100 so as to avoid damage to the fluid filter 100 and/or various components thereof.

Referring again to FIGS. 2-4, the locator spring 220 may generally be arranged such that it locates the relief valve assembly 200 in the fluid filter 100 (FIG. 1), thereby maintaining an appropriate configuration and preventing leakage or disengagement of the relief valve assembly 200 from the filter media 300. Such a configuration may be maintained because the locator spring 220 is joined to the bypass housing 205 and is compressed between the bypass housing 205 and the bypass end 120 of the filter canister 103. In particular embodiments, the locator spring 220 is joined to the trailing portion 230 of the bypass housing 205. For example, the locator spring 220 may be clenched within the circumferential shoulder 235, 235' of the bypass housing 205. That is, the circumferential shoulder 235, 235' may be shaped and sized to receive the locator spring 220 such that the locator spring 220 fits tightly within the circumferential shoulder 235, 235'. In addition, the circumferential shoulder 235, 235' causes a pressure to be applied to the locator spring 220 to maintain the location of the locator spring 220 within the circumferential shoulder 235 such that it does not become dislodged or otherwise disconnected from the bypass housing 205. In some embodiments, the locator spring 220 may be press-fit against the internal face 240 of the bypass housing 205. That is, the bypass housing 205 may be shaped and sized so as to receive the locator spring 220 against the internal face 240. Such a configuration may be similar to that of the circumferential shoulder 235 in that the locator spring 220 fits tightly within the internal face 240. In addition, the internal face 240 may cause a pressure to be applied to the locator spring 220 to maintain the location of the locator spring 220 within the bypass housing 205 such that it does not become dislodged or otherwise disconnected from the bypass housing 205.

Referring also to FIG. 1, it is noted that the locator spring 220 is generally free to move laterally (e.g., in the +x/−x direction and/or in the +z/−z direction) relative to a compression axis of the spring 220 along an internal face 154 of the bypass end 120 of the filter canister 103. This free movement may allow the locator spring 220 to slip into place with respect to the bypass housing 205 when the fluid filter 100 is assembled, thereby ensuring the locator spring 220 maintains an appropriate orientation and preventing leakage or disengagement of the relief valve assembly 200 from the filter media 300. It is noted that this freedom of movement with respect to the internal face 154 of the bypass end 120 of the filter canister 103 allows the locator spring 220 to locate itself with respect to the filter canister 103 and be used with a variety of filter canister sizes, shapes, and/or the like. Moreover, such an arrangement of the locator spring 220 with respect to the bypass housing 205 may further allow the locator spring 220 to function as an aftermarket component that is attached to existing bypass housing components.

Compression of the locator spring 220 between the bypass housing 205 and the bypass end 120 of the filter canister 103 is such that the trailing portion 230 of the bypass housing 205 forcibly engages the bypass end 310 of the filter media 300. In addition, compression of the locator spring 220 between the bypass housing 205 and the bypass end 120 of the filter canister 103 is such that a seated end 305 of the filter media 300 forcibly engages the outlet end 115 of the filter canister 103. Accordingly, the filter media 300 is compressed between the outlet end 115 of the filter canister 103 and the bypass housing 205.

Referring to FIGS. 1-4, the filter canister 103, the fluid inlet 135, the fluid outlet 130, and the filter media 300 may define an unfiltered fluid zone and a filtered fluid zone within the filter canister 103. Fluid may generally pass between the unfiltered fluid zone and the filtered fluid zone via the valve plug 215 (FIGS. 2-4) when the valve plug 215 is in an open position, as depicted in FIG. 4 and described in greater detail herein. Accordingly, the valve plug 215 (FIGS. 2-4) may define a fluid partition between the unfiltered fluid zone and the filtered fluid zone of the filter canister 103. When fluid flows between the unfiltered fluid zone and the filtered fluid zone via the relief valve assembly 200, it may generally bypass the filter media 300. Such a bypass may be necessary, for example, when the filter media 300 is clogged or when the viscosity of the fluid exceeds a viscosity threshold of the filter media 300. Accordingly, the function of relief valve assembly 200 may ensure that fluid continues to flow through the fluid outlet 130 even in instances where the filter media 300 is clogged and/or the fluid has a high viscosity.

At least a portion of the relief valve assembly 200, particularly the bypass housing 205, may generally be comprised of any material, particularly materials suitable to retain fluids and/or pressurized fluids, as described herein. In some embodiments, the bypass housing 205 may be made of tin plate steel, such as a tin plate steel material having a thickness of about 0.010 inches.

It is noted that the particular valve plug 215 described herein is merely presented for illustrative purposes and it is contemplated that other valve plug configurations may be used without departing from the scope of the present disclosure. For example, and not by way of limitation, suitable valve plug configurations are shown and described in U.S. Patent Publication No. 2014/0251465, filed on May 16, 2014, and entitled "Tip-Resistant Valve Plugs."

Figure 5:
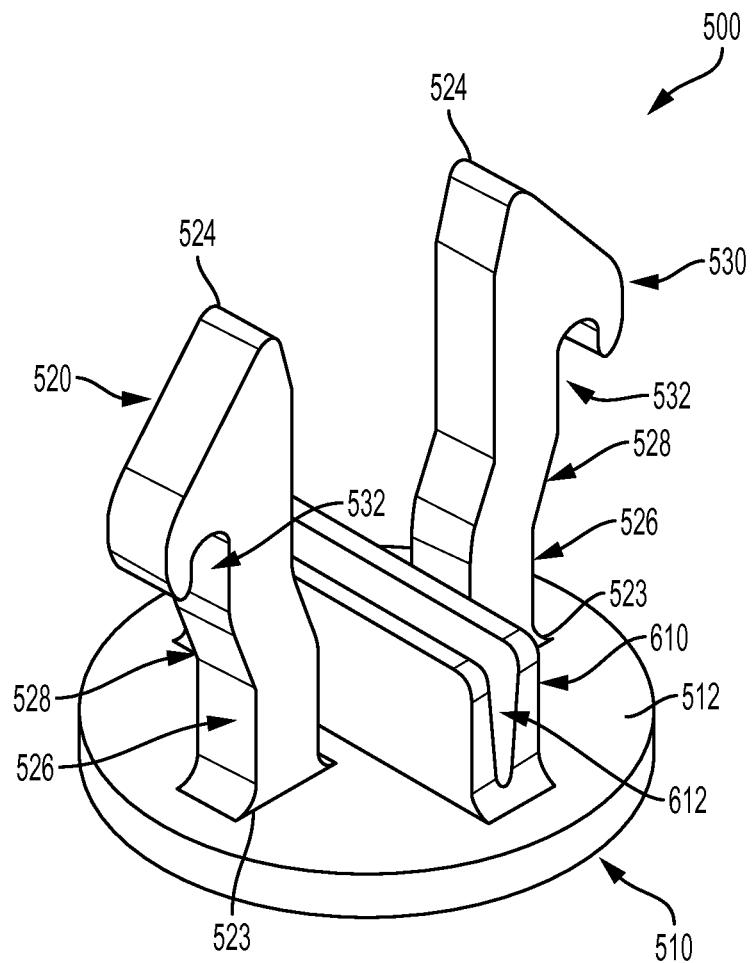
FIG. 5 is an isometric view of an alternative valve plug with enhanced retention legs.
Figure 6A:
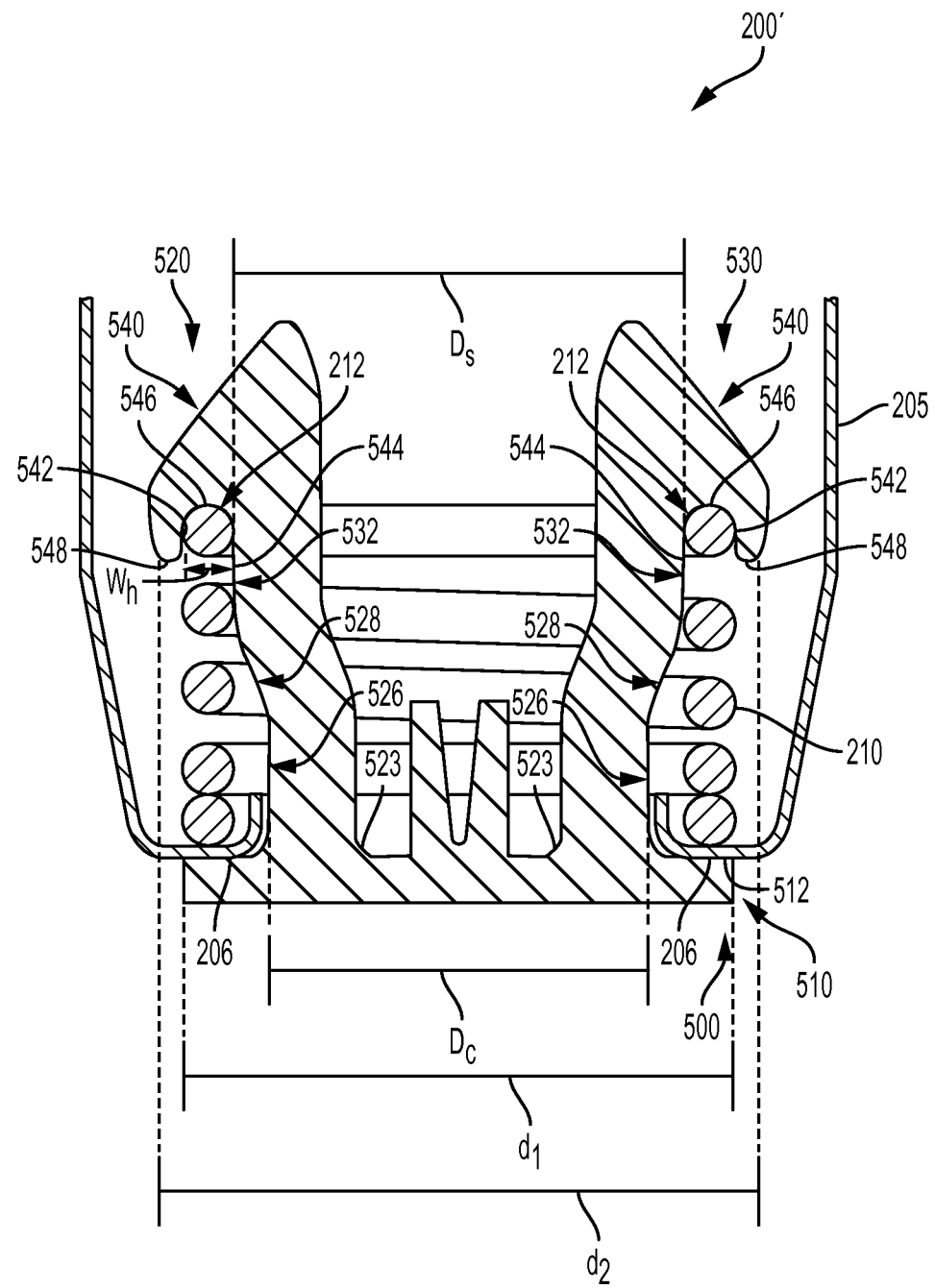
FIGS. 6a and 6b are cross-sectional illustrations of a pressure sensitive valve assembly incorporating the alternative valve plug of FIG. 5 in the closed and opened states, respectively.
Figure 6B:
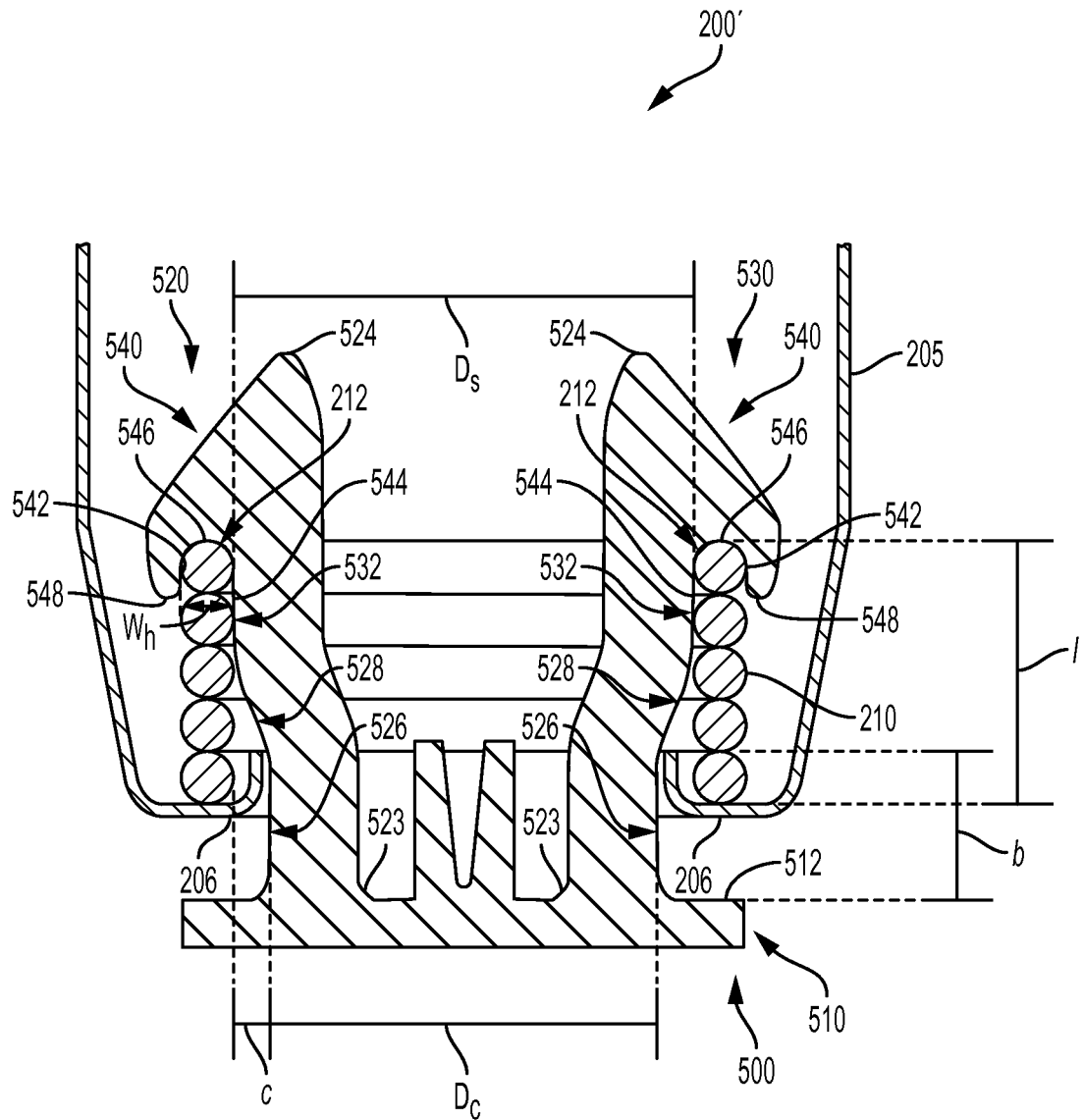

FIG. 5 depicts a further alternative valve plug 500 with enhanced retention legs and FIGS. 6A and 6B illustrate the alternative valve plug 500 within a pressure sensitive valve assembly 200' in the closed and opened states, respectively. The pressure sensitive valve assembly 200' can be inserted into the fluid filter of FIG. 1 such that the fluid filter 100 includes a filter canister 103, fluid inlets 135, a fluid outlet 130, filter media 300, an outer non-filtering zone 105, a pressure relief flow path, and a pressure sensitive valve assembly 200'.

Referring specifically to FIG. 1, it is contemplated that the filter media 300 may define an inner fluid passage 320 extending from the outer non-filtering zone 105 to the fluid outlet 130 and that the filter media 300 may be disposed in a fluid path within the filter canister between the fluid inlets 135 and the fluid outlet 130 of the fluid filter 100. In this manner, the fluid outlet 130 can be aligned with the inner fluid passage 320 of the filter media 300 and the pressure relief flow path can be made to extend from the fluid inlet 130 to the outer non-filtering zone 105, through the inner fluid passage 320, and out through the fluid outlet 130. It is further contemplated that the concepts of the present disclosure are applicable to a variety of alternative filter configurations, either conventional or those that are yet to be developed.

Referring to FIGS. 1, 6A, and 6B, the pressure sensitive valve assembly 200' is disposed within the pressure relief flow path and includes an orifice surround 206, a pressure relief spring 210, and a valve plug 500 comprising a valve head 510 and first and second retention legs 520, 530. The valve head 510 of the valve plug includes a continuous partition defining a fluid barrier. The pressure sensitive valve assembly 200' is configured to transition between a closed state where the orifice surround engages a sealing side 512 of the valve head 510 (as shown in FIG. 6A) and an open state characterized by increased compression in the pressure relief spring 526 and where the sealing side 512 of the valve head 510 is spaced from the orifice surround 206 (as shown in FIG. 6B).

Referring to FIGS. 5-8, the first and second retention legs 520, 530 of the valve plug 500 are spaced apart from one another, extend from a leg base 523 positioned at the sealing side 512 of the valve head 510 to a distal end 524 of the retention leg 520, 530. The first and second retention legs 530, 520 include respective seating regions 532, tapered transition regions 528, and clearance regions 526. The respective clearance regions 526 of the first and second retention legs 520, 530 extend from the valve head 512 to the tapered transition regions 528 of the first and second retention legs 520, 530. The tapered transition regions 528 of the first and second retention legs 520, 530 extend outwardly from the clearance regions 526 to the seating regions 532 of the first and second retention legs 520, 530 such that the first and second retention legs 520, 530 collectively define a seating region diameter $D_s$ that is greater than a clearance region diameter $D_c$ of the valve plug 500. For example, and not by way of limitation, it may be preferable to ensure that the seating region diameter $D_s$ is at least 0.54" (13.7 mm), about 0.57" (14.5 mm) or between about 0.54" (13.7 mm) and about 0.60" (15.2 mm). By way of comparison, and not by way of limitation, it may be preferable to ensure that the clearance region diameter $D_c$ is at least 0.45" (11.4 mm), about 0.48" (12.2 mm) or between about 0.45" (11.4 mm) and about 0.50" (12.7 mm).

Referring specifically to FIG. 6A, each of the respective seating regions 532 include a spring engaging hook 540 that is structurally configured to receive a seating portion 212 of the pressure relief spring 210. Each spring engaging hook 540 includes an inner guiding face 544, an outer containing face 542 substantially parallel to the inner guiding face, and a bridging face 546 extending from the inner guiding face 544 to the outer containing face 542. The inner guiding face 544 and the outer containing face 542 of each spring engaging hook 540 are oriented substantially parallel to a direction of compression of the pressure relief spring 210 and are spaced apart from one another by a hook width, $W_h$, that is at least as large as a radial thickness dimension of the seating portion 212 of the pressure relief spring 210. As such, the pressure relief spring 210 is compressed between the orifice surround 206 and the spring engaging hooks 540 to bias the pressure relief valve assembly 200' toward the closed state. The inner guiding face 544 of each spring engaging hook 540 extends from the bridging face 546 of the spring engaging hook 540 to the tapered transition region 528 of the retention leg 520, 530. The outer containing face 542 of each retention leg 520, 530 extends from the bridging face 546 of the spring engaging hook 540 of the retention leg 520, 530 to a hook terminus 548 that is displaced from the bridging face by a containment length, $L_c$, that is at least as great as one-half of the hook width, $W_h$. For example, and not by way of limitation, it may be preferable to ensure that the containment length, $L_c$, is at least 0.035" (0.9 mm), about 0.074" (14.5 mm) or between about 0.035" (0.9 mm) and about 0.10" (2.5 mm). By way of comparison, and not by way of limitation, it may be preferable to ensure that the hook width, $W_h$, is at least 0.05" (1.3 mm), about 0.07" (1.8 mm) or between about 0.05" (1.3 mm) and 0.10" (2.5 mm).

Still referring to FIG. 6A, the hook termini 548 of the first and second retention legs 520, 530 may define a hook terminus diameter $d_1$ that is greater than an outer valve head diameter $d_2$ of the valve head 510. For example, and not by way of limitation, it may be preferable to ensure that the hook terminus diameter $d_1$ is at least 0.75" (19.1 mm), about 0.79" (20.1 mm) or between about 0.75" (19.1 mm) and about 0.80" (20.3 mm). By way of comparison, and not by way of limitation, it may be preferable to ensure that the outer valve head diameter $d_2$ is at least 0.65" (16.5 mm), about 0.70" (17.8 mm) or between about 0.65" (16.5 mm) and about 0.75" (19.1 mm). Although having the relatively large hook terminus diameter $d_1$ can help ensure proper seating of the pressure relief spring 210 in the spring engaging hooks 540, it is also contemplated that, in other embodiments, the hook terminus diameter $d_1$ may be equal to or less than the diameter $d_2$ of the valve head 510.

Figure 9:
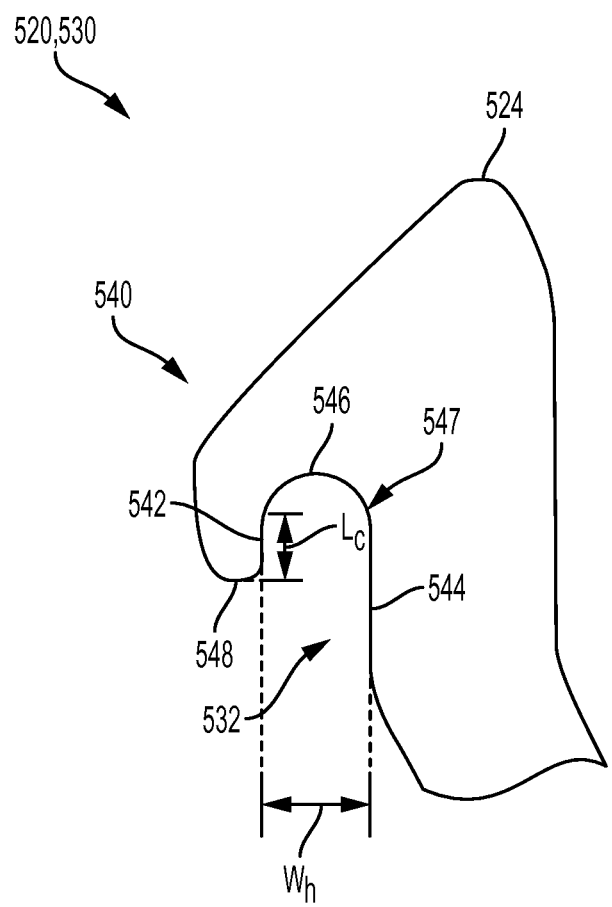
FIG. 9 is a side sectional view of an illustrative spring engaging hook according to one or more embodiments shown and described herein.

Referring to FIG. 9, in further embodiments of the spring engaging hook 540, the containment length, $L_c$, of the outer containing face 542 does not exceed a length of the inner guiding face 544 of the spring engaging hook. As described above, the containment length, $L_c$, may be at least 0.035"

(0.9 mm), about 0.074" (1.9 mm) or between about 0.035" (0.9 mm) and about 0.10" (2.5 mm). By way of comparison, and not by way of limitation, it may be preferable to ensure then that the length of the inner guiding face 544 is at least 0.05" (1.3 mm), about 0.14" (3.6 mm) or between about 0.05" (1.3 mm) and about 0.18" (4.6 mm). In other embodiments, it is contemplated the containment length, $L_c$, of the outer containing face 542 equals or exceeds the length of the inner guiding face 544 of the spring engaging hook 540.

Figure 10A:
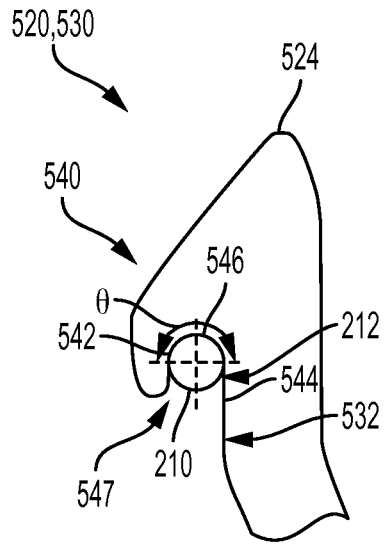
FIGS. 10a-10d are side sectional views of alternative spring engaging hook configurations according to one or more embodiments shown and described herein.
Figure 10B:
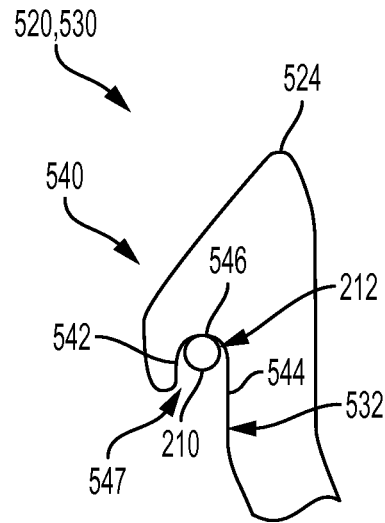
Figure 10C:
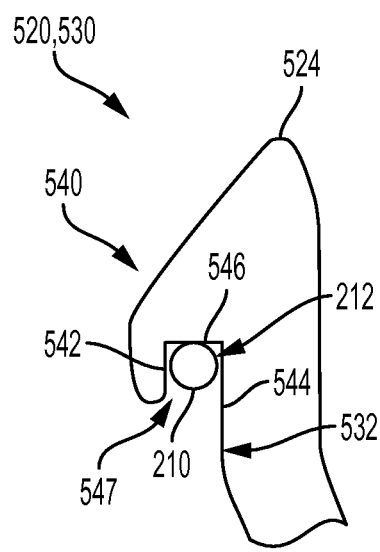
Figure 10D:
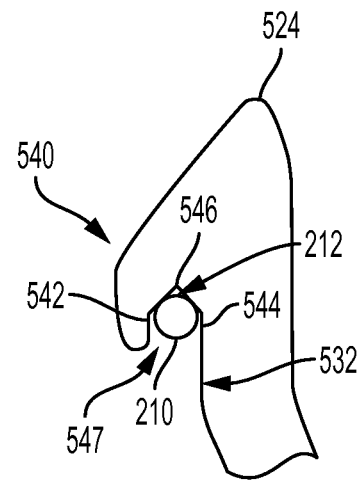

FIGS. 10a-10d illustrate additional non-limiting embodiments of the spring engaging hook 540 of the valve plug 500. In some embodiments, such as that illustrated in FIG. 10a, the inner guiding face 544, the outer containing face 542, and the bridging face 546 of each of the spring engaging hooks 540 may collectively define a spring seat 547 that is sized and shaped for approximately 180 degrees of contact with the seating portion 212 of the pressure relief spring 210 (see angle θ in FIG. 10a). In other embodiments, as illustrated in FIGS. 10b through 10d, the spring seat 547 is sized and shaped such that one or more points of the seating portion 212 of the pressure relief spring contacts bridging face 546 of the spring engaging hook 540. As such, the spring seat 547 may have a variety of geometries for engaging the seating portion 212 of the pressure relief spring 210. For example, the bridging face 546 of the spring engaging hook 540 may be a substantially planar face(s) (as shown in FIGS. 10c and 10d), a substantially curved face (as shown in FIGS. 10a, and 10b), or a combination thereof. Similarly, the inner guiding face 544 and the outer containing face 542 of the spring engaging hook 540 may be substantially planar faces, substantially curved faces, or a combination thereof.

Referring to again to FIG. 6B, the first and second retention legs in the respective clearance regions may be oriented substantially parallel to a direction of compression of the pressure relief spring 210 and may be spaced radially inward of the pressure relief spring 210 by a clearance distance c that is sufficient to mitigate drag between the pressure relief spring 210 and the first and second retention legs 520, 530 in the respective clearance regions 526 as the pressure relief spring 210 compresses and decompresses. For example, and not by way of limitation, it may be preferable to ensure that the clearance distance c is at least 0.05" (1.25 mm), about 0.08" (2 mm) or between about 0.05" (1.25 mm) and about 0.1" (2.5 mm).

The pressure relief spring 210 may be characterized by a compression length l at a bypass pressure of between about 10 psi and about 25 psi. In some embodiments, the respective clearance regions 526 of the first and second retention legs 520, 630 may extend from the valve head 510 to the tapered transition regions 528 for a clearance region length b. The clearance region length b may be greater than the compression length l of the pressure relief spring 210. For example, and not by way of limitation, it may be preferable to ensure that the compression length l is at least 0.275" (7 mm), about 0.33" (8.4 mm) or between about 0.275" (7 mm) and about 0.44" (11.2 mm). By way of comparison, and not by way of limitation, it may be preferable to ensure then that the clearance region length b is at least 0.15" (3.8 mm), about 0.175" (4.4 mm) or between about 0.15" (3.8 mm) and about 0.2" (5 mm).

In some embodiments of the valve plug 500, the sealing side 512 of the valve head 510 may include a unitary or compound surface profile with substantially planar face portions, substantially curved face portions, or a combination thereof. As such, the sealing side 512 of the valve head 510 may have a variety of shapes not limited the relatively planar face depicted in FIG. 5.

The valve plug 500, as described herein, may comprise additional structure that may support a variety of functions including alignment and anti-tipping functions. For example, FIG. 5 illustrates an isometric view of an exemplary valve plug 500 according to one or more embodiments described herein further including an anti-tip fin 610 disposed between the first and second retention legs 520, 530. The anti-tip fin 610 extends from the sealing side 512 of the valve head 510 in a direction of the respective distal ends 524 of the first and second retention legs 520, 530. In some embodiments, the anti-tip fin may include a groove 612 extending along the anti-tip fin 610 in the longitudinal direction and define a longitudinal axis. The groove 612 may allow the valve head 510 to flex along the longitudinal axis.

Figure 7:
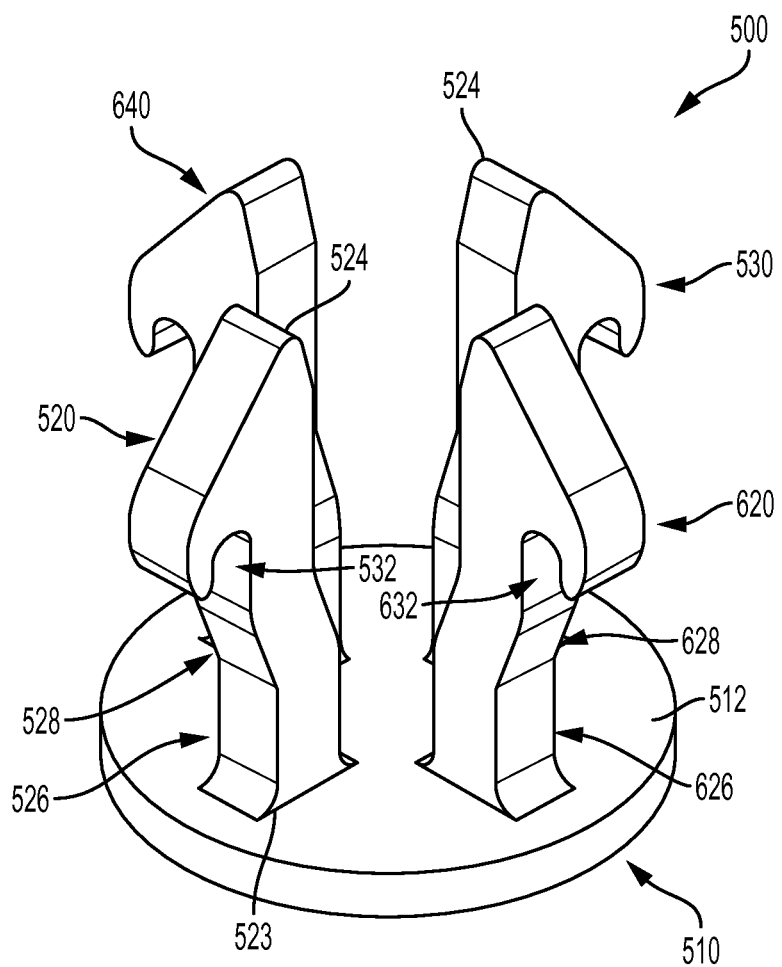
FIG. 7 is an isometric view of another illustrative valve plug with enhanced retention legs according to one or more embodiments shown and described herein.

Referring now to FIG. 7, in some embodiments the valve plug may further include third and fourth retention legs 620, 630 extending from the sealing side 512 of the valve head 510 and defining a substantially similar geometry as the first and second retention legs 520, 530. As such, the third and fourth retention legs 620, 630 may comprise respective clearance regions 626, tapered transition regions 628, and seating regions 632 as described herein with reference to the first and second retention legs 520, 530. The first, second, third, and fourth retention legs 520, 530, 620, 630 may be equably distributed about the periphery of the sealing side 512 of the valve head 510. It is contemplated that in some embodiments the valve plug may include only an additional third retention leg 630. In such embodiments, the first, second, and third retention legs 520, 530, 620 may be equably distributed about the periphery of the sealing side 512 of the valve head 510.

Figure 8:
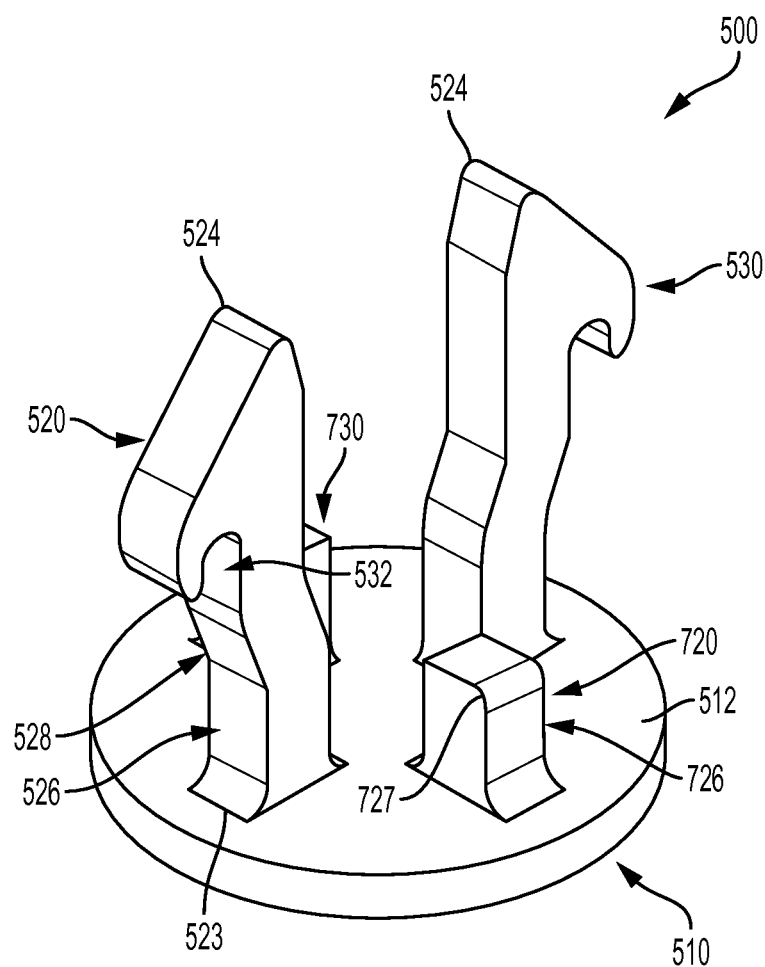
FIG. 8 is an isometric view of yet another illustrative valve plug with enhanced retention legs according to one or more embodiments shown and described herein.

Referring now to FIG. 8, in some embodiments, the valve plug further includes first and second dummy legs 720, 730 extending from the sealing side 512 of the valve head in a direction substantially parallel to the first and second retention legs 520, 530. The first and second dummy legs 720, 730 may include a dummy leg clearance region 726. It is contemplated that these dummy legs may provide the alignment and anti-tipping functions noted above in the discussion of the anti-tip fin 610 of FIG. 5.

The dummy leg clearance region 726 may extend from the sealing side 512 of the valve head 510 and may be oriented substantially parallel to a direction of compression of the pressure relief spring 210. The dummy leg clearance region 726 and the respective clearance regions 526 of the first and second retention legs 520, 530 may extend from the sealing side 512 of the valve head 510 by substantially equal lengths. In the illustrated embodiment, the dummy leg clearance region 726 comprises an outside radius portion 727 at a leading end thereof to help ensure that the valve plug 500 can be properly guided through the orifice surround 206. It is contemplated that a beveled surface, or other suitable surface modification, may be provided as an alternative to, or in addition to, the outside radius portion 727. Furthermore, the first and second dummy legs 720, 730 may collectively define a dummy leg clearance region diameter that is substantially congruent with the clearance region diameter, $D_c$, of the first and second retention legs 520, 530.

As shown in FIG. 1, in various embodiments, the fluid filter 100 may further include a backflow valve assembly 400. The backflow valve assembly 400 may be structurally similar to the relief valve assembly 200. Thus, the backflow valve assembly 400 may include at least a housing, a spring, and a valve plug similar to the components described herein with respect to the relief valve assembly 200. In some embodiments, the backflow valve assembly 400 may be disposed in a fluid path between the inner fluid passage 320 of the filter media 300 and the fluid outlet 130. For example, the backflow valve assembly 400 may be positioned at the seated end 305 of the filter media 300. Accordingly, the backflow valve assembly 400 may be fluidly coupled to the inner fluid passage 320 of the filter media 300 and the fluid outlet 130 such that fluid may flow from the inner fluid passage 320 through the backflow valve assembly 400 to the fluid outlet 130.

In some embodiments, the backflow valve assembly 400 may be arranged such that it is open under normal flow conditions (i.e., substantially no fluid is backflowing from the fluid outlet 130). Such an open position may allow fluid to pass from the inner fluid passage 320 of the filter media 300 through the backflow valve assembly 400 to the fluid outlet 130. When fluid backflows into the fluid outlet 130, an increased backflow fluid pressure against the valve plug from the fluid may cause the backflow valve assembly 400 to close and prevent fluid flow therethrough.

Referring again to FIG. 1, the filter media 300 defines a seated end 305, a bypass end 310, an outer filtering zone 315, and an inner fluid passage 320 extending from the seated end 305 to the bypass end 310 of the filter media 300. Thus, when the filter media 300 is placed within the filter canister 103 as described herein, the seated end 305 generally faces the outlet end 115 of the filter canister 103, the bypass end 310 generally faces the bypass end 120 of the filter canister 103, and the outer filtering zone 315 generally extends from the seated end 305 to the bypass end 310 of the filter media 300 and surrounds the inner fluid passage 320. In addition, the filter media 300 may be generally sized and shaped to correspond to the size and/or shape of the filter canister 103. Thus, in embodiments where the filter canister 103 is a substantially cylindrical filter canister 103, the filter media 300 may have a cylindrical filter media profile that corresponds to the shape and size of the filter canister 103.

The filter media 300 is disposed in a fluid path within the filter canister 103 between the peripherally distributed inlet orifices and the fluid outlet 130 of the fluid filter 100 such that the fluid outlet 130 is aligned with the inner fluid passage 320 of the filter media 300. Thus, the inner fluid passage 320 of the filter media 300 is fluidly coupled to fluid inlet 135 and/or fluidly coupled to the fluid outlet 130. Accordingly, it may be recognized that such a configuration may allow fluid to flow in the fluid inlet 135, through the inner fluid passage 320 of the filter media 300, and out the fluid outlet 130.

The composition and/or structure of the filter media 300, other than as described herein, is not limited by this disclosure. Thus, the filter media 300 may generally be any filter media now known or later developed, particularly filter media configured to filter fluids, fluid-like compositions, multi-phase fluids, and/or the like. Illustrative fluids may include, but are not limited to, oil, gasoline, water, alcohol, or combinations thereof. In some embodiments, the filter media 300 may be compositionally and structurally configured to remove particulates from motor oil. For example, the filter media 300 may include a substrate that includes alumina, activated clay, cellulose, a cement binder, silica-alumina, polymer matrices, activated carbon, or combinations thereof. In some embodiments, the filter media 300 may be compositionally and structurally configured to react chemically with one or more components of motor oil, gasoline, water, alcohol, or combinations thereof. For example, the filter media 300 may include barium oxide (BaO), calcium carbonate ($CaCO_3$), calcium oxide (CaO), calcium hydroxide ($Ca(OH)_2$), magnesium carbonate ($MgCO_3$), magnesium hydroxide ($Mg(OH)_2$), magnesium oxide (MgO), sodium aluminate ($NaAlO_2$), sodium carbonate ($Na_2CO_3$), sodium hydroxide (NaOH), zinc oxide (ZnO), or combinations thereof. In another example, the filter media 300 may include a hydroperoxide decomposing component selected from molybdenum disulfide ($MoS_2$), $Mo_4S_4$ $(ROCS_2)_6$, sodium hydroxide (NaOH), or combinations thereof. In some embodiments, the filter media 300 may include a physical adsorption component that is compositionally and structurally configured to adsorb components of motor oil, gasoline, water, alcohol, or combinations thereof. In another embodiment, the filter media 300 may include porous paper, glass fibers, spun polymer filaments, or combinations thereof for passive removal of one or more particulate components from the fluid. Such compositions and structures may generally be incorporated in any portion of the filter media 300, such as, for example, the outer filtering zone 315.

It is also noted that recitations herein of "at least one" component, element, etc., should not be used to create an inference that the alternative use of the articles "a" or "an" should be limited to a single component, element, etc. For example, reference herein to "an inner fluid passage" contemplates both a single inner fluid passage and a plurality of fluid passages.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "substantially" and "approximately" are utilized herein to represent the inherent degree of uncertainty that may be attributed to any quantitative comparison, value, measurement, or other representation. For example, a "substantially cylindrical filter canister" may refer to a filter canister that is generally cylindrical in shape, but may contain additional components that prevent the canister from being an exact cylinder. The terms "substantially" and "approximately" are also utilized herein to represent the degree by which a quantitative representation may vary from a stated reference without resulting in a change in the basic function of the subject matter at issue. For example, an orifice that is substantially centrally located on a mounting plate may be generally at or near a central portion of the mounting plate, but will retain its basic function regardless of the location with respect to the true central portion of the mounting plate.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A pressure sensitive valve assembly comprising an orifice surround, a pressure relief spring, and a valve plug comprising a valve head and first and second retention legs, wherein:
    the valve head of the valve plug comprises a continuous partition defining a fluid barrier;
    the pressure sensitive valve assembly is configured to transition between a closed state where the orifice surround engages a sealing side of the valve head and an open state characterized by increased compression in the pressure relief spring and where the sealing side of the valve head is spaced from the orifice surround;
    the first and second retention legs of the valve plug are spaced apart from one another, extend from a leg base positioned at the sealing side of the valve head to a distal end of the retention leg, and comprise respective seating regions, tapered transition regions, and clearance regions;
    the respective clearance regions of the first and second retention legs extend from the valve head to the tapered transition regions of the first and second retention legs;
    the tapered transition regions of the first and second retention legs extend outwardly from the clearance regions to the seating regions of the first and second retention legs such that the first and second retention legs collectively define a seating region diameter that is greater than a clearance region diameter of the valve plug;
    each of the respective seating regions comprises a spring engaging hook structurally configured to receive a seating portion of the pressure relief spring;
    each spring engaging hook comprises an inner guiding face, an outer containing face substantially parallel to the inner guiding face, and a bridging face extending from the inner guiding face to the outer containing face;
    the inner guiding face and the outer containing face of each spring engaging hook are oriented substantially parallel to a direction of compression of the pressure relief spring and are spaced apart from one another by a hook width that is at least as large as a radial thickness dimension of the seating portion of the pressure relief spring;
    the pressure relief spring is compressed between the orifice surround and the spring engaging hooks to bias the pressure sensitive valve assembly towards the closed state;
    the inner guiding face of each spring engaging hook extends from the bridging face of the spring engaging hook to the tapered transition region of the retention leg;
    the outer containing face of each retention leg extends from the bridging face of the spring engaging hook of the retention leg to a hook terminus that is displaced from the bridging face by a containment length that is at least as great as one-half of the hook width.

2. The pressure sensitive valve assembly of claim 1, wherein the inner guiding face, the outer containing face, and the bridging face of each of the first and second spring engaging hooks collectively define a spring seat that is sized and shaped for approximately 180 degrees of contact with the seating portion of the pressure relief spring.

3. The pressure sensitive valve assembly of claim 1, wherein the containment length of the outer containing face of the spring engaging hook does not exceed a length of the inner guiding face of the spring engaging hook.

4. The pressure sensitive valve assembly of claim 1, wherein the bridging face of the spring engaging hook comprises a substantially planar face, a substantially curved face, or a combination thereof.

5. The pressure sensitive valve assembly of claim 1, wherein the inner guiding face and the outer containing face of the spring engaging hook comprise substantially planar faces, substantially curved faces, or a combination thereof.

6. The pressure sensitive valve assembly of claim 1, wherein the hook termini of the retention legs collectively define a hook terminus diameter $d_1$ that is greater than an outer valve head diameter $d_2$ defined by the valve head.

7. The pressure sensitive valve assembly of claim 1, wherein:
    the containment length of the outer containing face of the spring engaging hook does not exceed a length of the inner guiding face of the spring engaging hook; and
    the hook termini of the retention legs collectively define a hook terminus diameter $d_1$ that is greater than an outer valve head diameter $d_2$ defined by the valve head.

8. The pressure sensitive valve assembly of claim 1, wherein the first and second retention legs in the respective clearance regions are oriented substantially parallel to the direction of compression of the pressure relief spring and are spaced radially inward of the pressure relief spring by a clearance distance c that is sufficient to mitigate drag between the pressure relief spring and the first and second retention legs in the respective clearance regions as the pressure relief spring compresses and decompresses.

9. The pressure sensitive valve assembly of claim 1, wherein:
    the inner guiding face, the outer containing face, and the bridging face of each of the first and second spring engaging hooks collectively define a spring seat that is sized and shaped for approximately 180 degrees of contact with the seating portion of the pressure relief spring; and
    the first and second retention legs in the respective clearance regions are oriented substantially parallel to the direction of compression of the pressure relief spring and are spaced radially inward of the pressure relief spring by a clearance distance c that is sufficient to mitigate drag between the pressure relief spring and the first and second retention legs in the respective clearance regions as the pressure relief spring compresses and decompresses.

10. The pressure sensitive valve assembly of claim 9, wherein:
    the pressure relief spring is characterized by a compression length l at a bypass pressure of between about 10 psi and about 25 psi; and
    the respective clearance regions of the first and second retention legs extend from the valve head to the tapered transition regions for a clearance region length b that is greater than the compression length l of the pressure relief spring.

11. The pressure sensitive valve assembly of claim 10, wherein:
the containment length, Lc, is between about 0.035" (0.9 mm) and about 0.10" (2.5 mm); and
the clearance distance c between about 0.05" (1.25 mm) and about 0.1" (2.5 mm).

12. The pressure sensitive valve assembly of claim 1, wherein the sealing side of the valve head of the valve plug comprises a unitary or compound surface profile with substantially planar face portions, substantially curved face portions, or a combination thereof.

13. The pressure sensitive valve assembly of claim 1, wherein the valve plug further comprises an anti-tip fin disposed between the first and second retention legs and extends from the sealing side of the valve head in a direction of the respective distal ends of the first and second retention legs.

14. The pressure sensitive valve assembly of claim 13, wherein the anti-tip fin of the valve plug comprises a groove extending along the anti-tip fin that allows the valve head to flex along a longitudinal axis.

15. The pressure sensitive valve assembly of claim 1, wherein the valve plug further comprises first and second dummy legs extending from the sealing side of the valve head in a direction substantially parallel to the first and second retention legs.

16. The pressure sensitive valve assembly of claim 15, wherein:
the first and second dummy legs of the valve plug each comprise a dummy leg clearance region;
the dummy leg clearance region extends from the valve head and is oriented substantially parallel to the direction of compression of the pressure relief spring; and
the dummy legs collectively define a dummy leg clearance region diameter that is substantially congruent with the clearance region diameter of the first and second retention legs.

17. The pressure sensitive valve assembly of claim 1, wherein the valve plug further comprises a third retention leg extending from the sealing side of the valve head and defining substantially similar geometry as the first and second retention legs.

18. The pressure sensitive valve assembly of claim 1, wherein the valve plug further comprises third and fourth retention legs extending from the sealing side of the valve head and defining substantially similar geometry as the first and second retention legs.

19. A fluid filter comprising a filter canister, a fluid inlet, a fluid outlet, filter media, a non-filtering zone, a pressure relief flow path, and a pressure sensitive valve assembly, wherein:
the filter media is disposed in a fluid path within the filter canister between the fluid inlet and the fluid outlet of the fluid filter;
the filter canister comprises a bypass end and an outlet end;
the pressure relief flow path extends from the fluid inlet through the non-filtering zone, and out through the fluid outlet;
the pressure sensitive valve assembly is disposed within the pressure relief flow path and comprises an orifice surround, a pressure relief spring, and a valve plug comprising a valve head and first and second retention legs;
the valve head of the valve plug comprises a continuous partition defining a fluid barrier;
the pressure sensitive valve assembly is configured to transition between a closed state where the orifice surround engages a sealing side of the valve head and an open state characterized by increased compression in the pressure relief spring and where the sealing side of the valve head is spaced from the orifice surround;
the first and second retention legs of the valve plug are spaced apart from one another, extend from a leg base positioned at the sealing side of the valve head to a distal end of the retention leg, and comprise respective seating regions, tapered transition regions, and clearance regions;
the respective clearance regions of the first and second retention legs extend from the valve head to the tapered transition regions of the first and second retention legs;
the tapered transition regions of the first and second retention legs extend outwardly from the clearance regions to the seating regions of the first and second retention legs such that the first and second retention legs collectively define a seating region diameter that is greater than a clearance region diameter of the valve plug;
each of the respective seating regions comprises a spring engaging hook structurally configured to receive a seating portion of the pressure relief spring;
each spring engaging hook comprises an inner guiding face, an outer containing face substantially parallel to the inner guiding face, and a bridging face extending from the inner guiding face to the outer containing face;
the inner guiding face and the outer containing face of each spring engaging hook are oriented substantially parallel to a direction of compression of the pressure relief spring and are spaced apart from one another by a hook width that is at least as large as a radial thickness dimension of the seating portion of the pressure relief spring;
the pressure relief spring is compressed between the orifice surround and the spring engaging hooks to bias the pressure sensitive valve assembly towards the closed state;
the inner guiding face of each spring engaging hook extends from the bridging face of the spring engaging hook to the tapered transition region of the retention leg; and
the outer containing face of each retention leg extends from the bridging face of the spring engaging hook of the retention leg to a hook terminus that is displaced from the bridging face by a containment length that is at least as great as one-half of the hook width.

* * * * *